United States Patent

[11] 3,556,439

| [72] | Inventors | Charles P. Autry;<br>Paul J. Baumgaertner; Eugene G. Hill,<br>Seattle, Wash. |
|---|---|---|
| [21] | Appl. No. | 778,164 |
| [22] | Filed | Nov. 22, 1968 |
| [45] | Patented | Jan. 19, 1971 |
| [73] | Assignee | The Boeing Company<br>Seattle, Wash.<br>a corporation of Delaware |

[54] METHODS AND HIGH LIFT SYSTEMS FOR MAKING AN AIRCRAFT WING MORE EFFICIENT FOR TAKEOFFS AND LANDINGS
14 Claims, 9 Drawing Figs.

| [52] | U.S. Cl. | 244/42 |
|---|---|---|
| [51] | Int. Cl. | B64c 3/50 |
| [50] | Field of Search | 244/42, 42.6, 42.1, 42.3 |

[56] References Cited
UNITED STATES PATENTS

| 2,177,798 | 10/1939 | Bechereau | 244/42 |
|---|---|---|---|
| 3,041,014 | 6/1962 | Gerin | 244/42 |
| 3,089,666 | 5/1963 | Quenzler | 244/7 |
| 3,319,248 | 6/1964 | Calderon | 244/42 |
| 3,195,836 | 7/1965 | Calderon | 244/42 |
| 3,246,335 | 4/1966 | Calderon | 244/42 |
| 2,072,299 | 3/1937 | Gerin | 244/43 |

*Primary Examiner*—Milton Buchler
*Assistant Examiner*—Carl A. Rutledge
*Attorneys*—Glenn Orlob and Theron H. Nichols ABSTRACT: A highly efficient aircraft wing is formed by drooping the leading edge portion and extending a leading edge flap for transforming the wing into the most efficient condition for takeoff, and by drooping the leading edge portion and extending a multiplicity of leading edge flaps for transforming the wing into the most efficient condition for landing. Another method comprises extending a leading edge flap from retracted position in the leading edge portion of a wing for transforming the wing into the most efficient condition for takeoff, and extending three leading edge flaps from retracted position in the wing leading edge portion for transforming the wing into the most efficient condition for landing.

At least two high lift systems for carrying out the above methods comprise mounting in the wing leading edge portion three interconnected, end-to-end, fore-and-aft, leading edge flaps and two different linkages for folding the three flaps internally of the leading edge portion operable by single and double actuators respectively.

INVENTORS:
CHARLES P. AUTRY
PAUL J. BAUMGAERTNER
EUGENE G. HILL
BY
Theron H. Nichols
AGENT

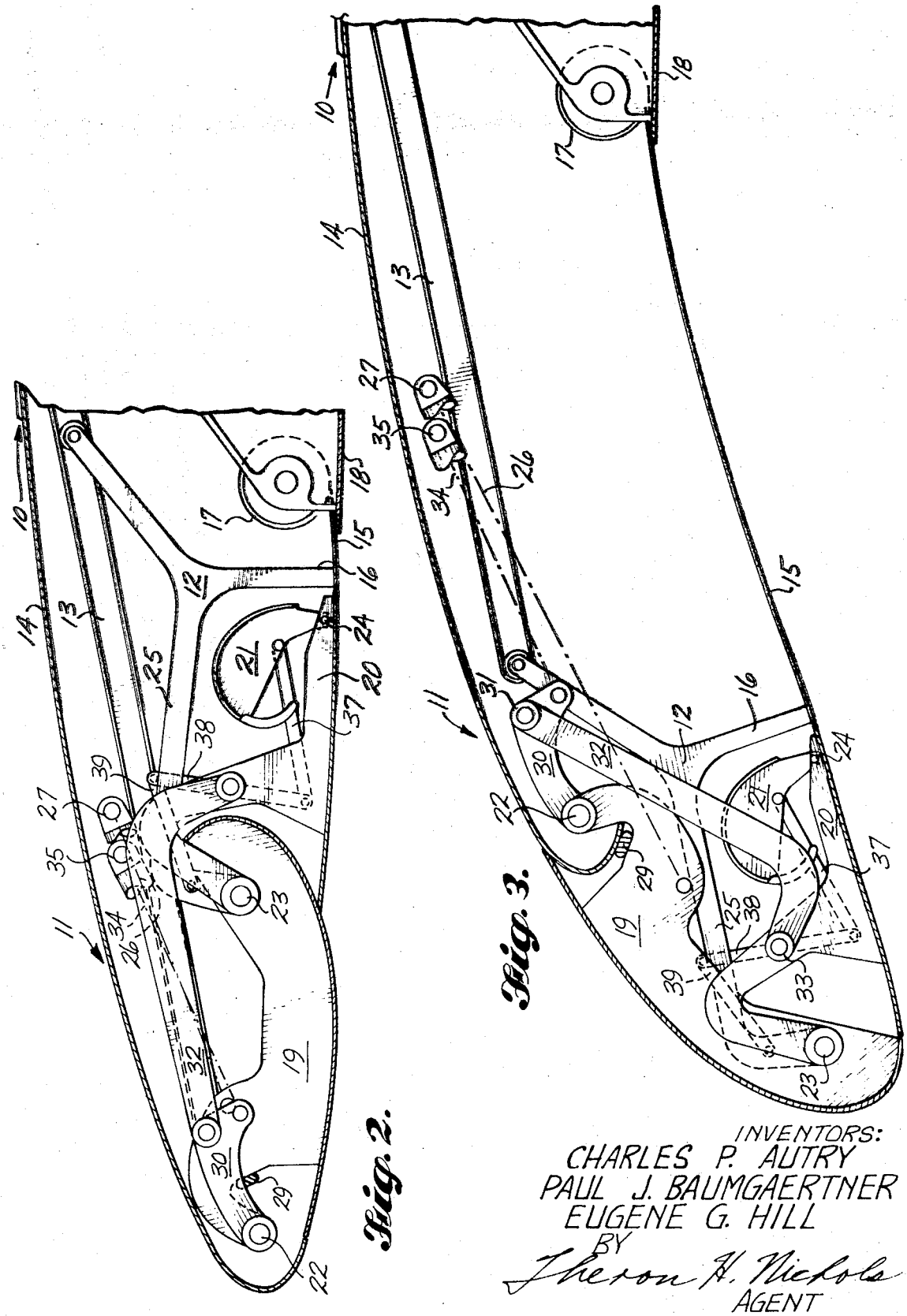

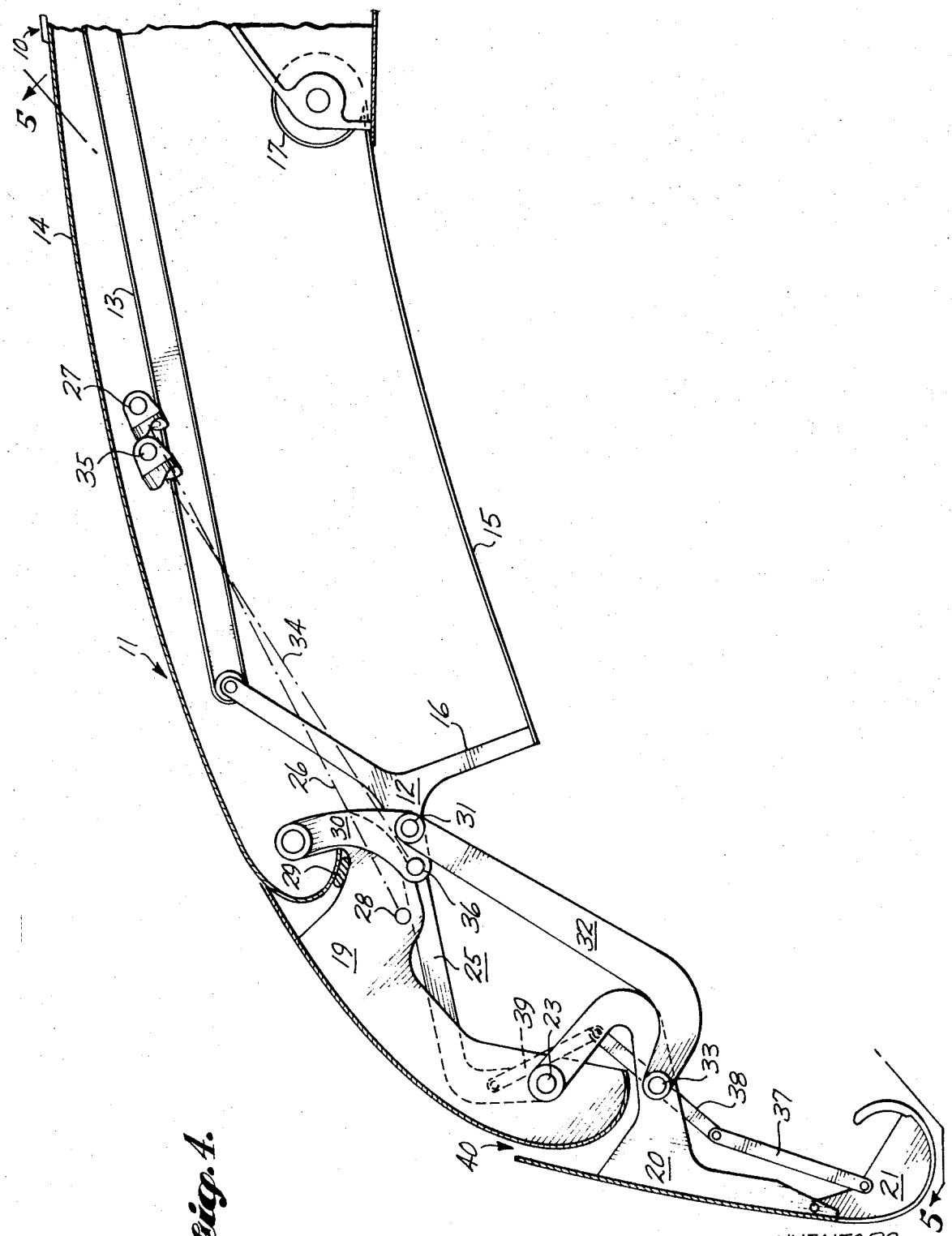

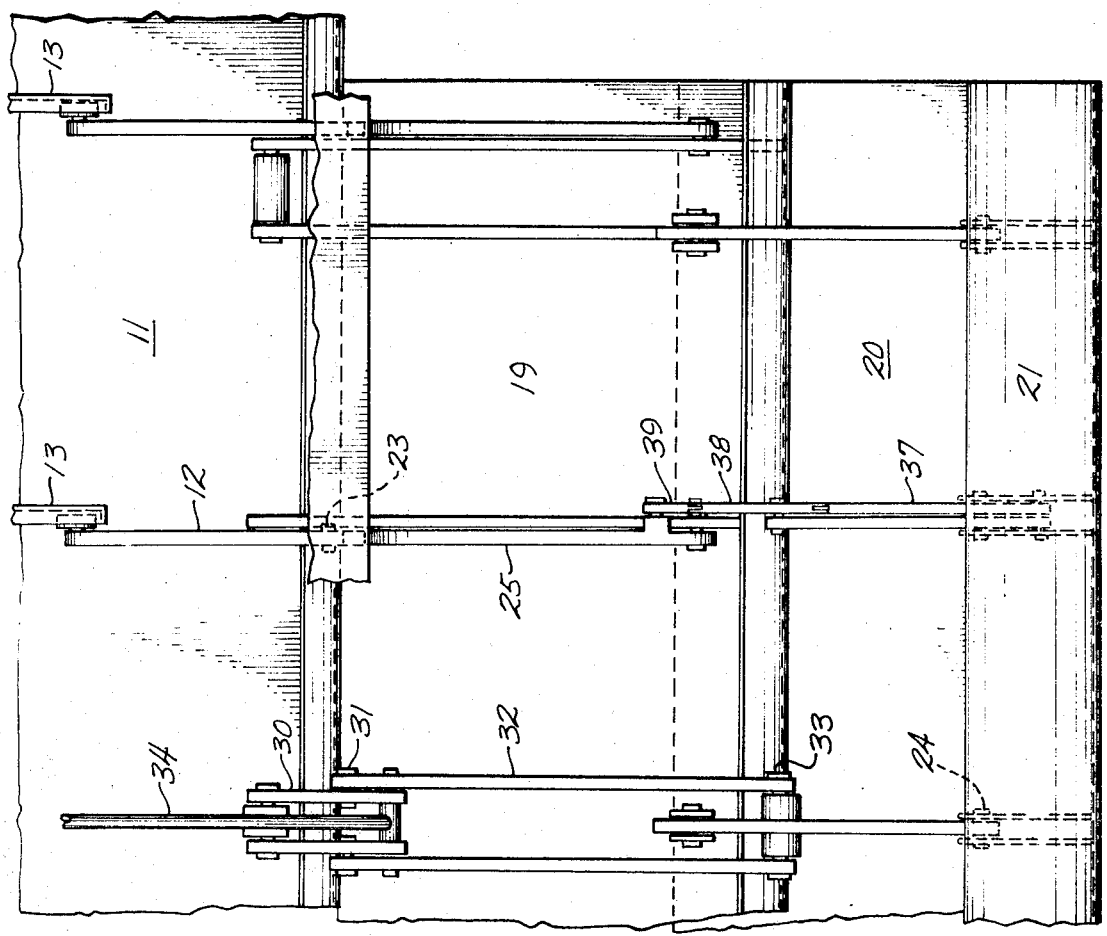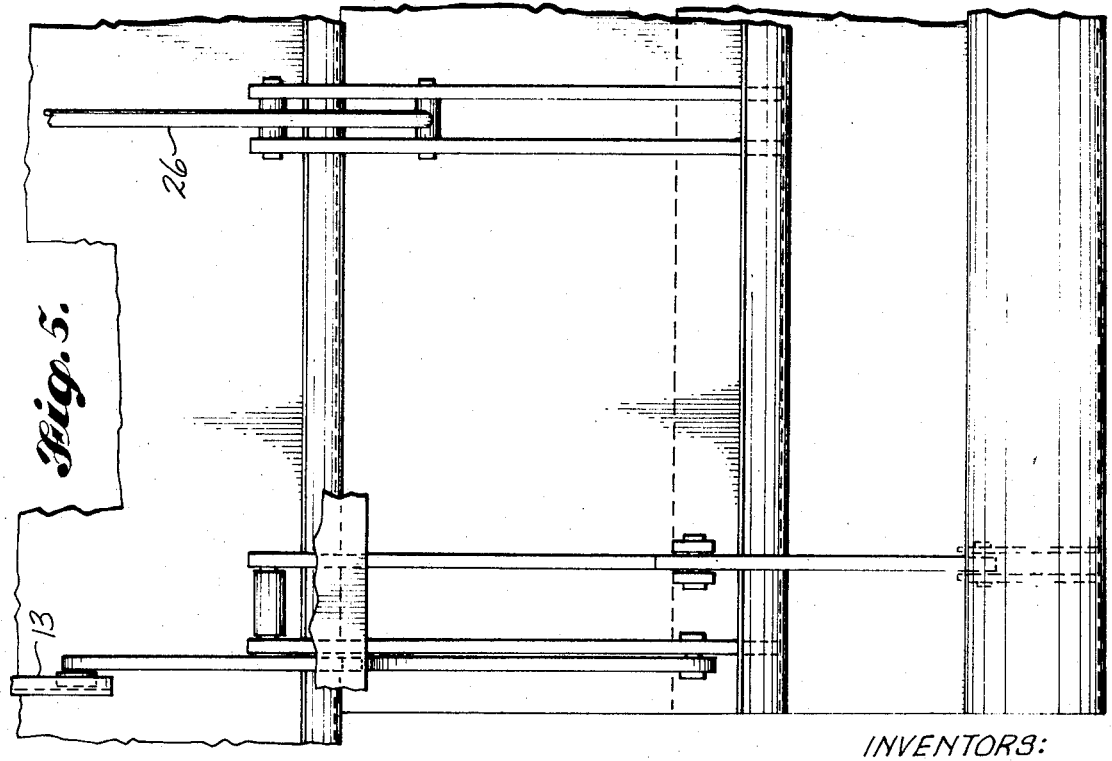

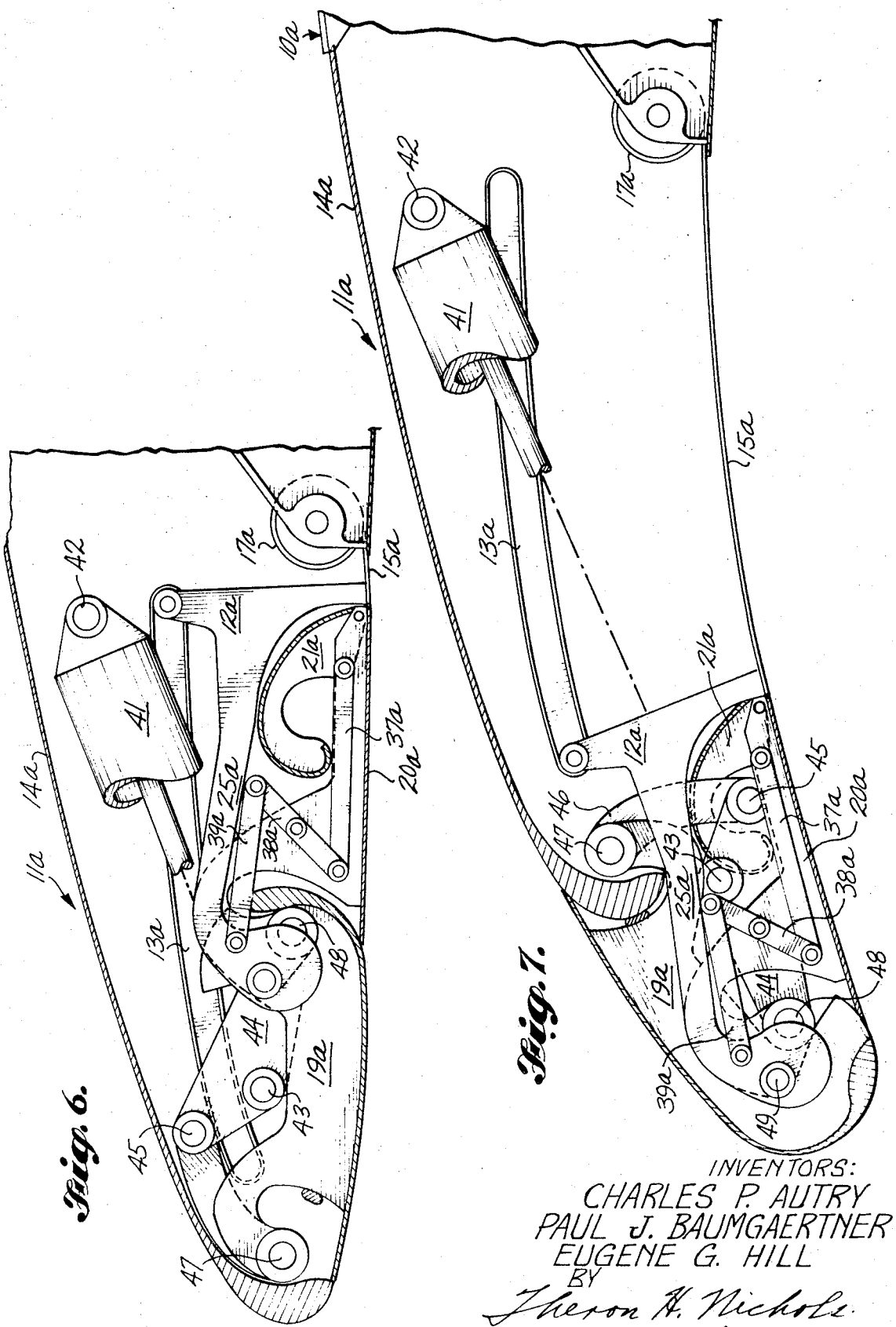

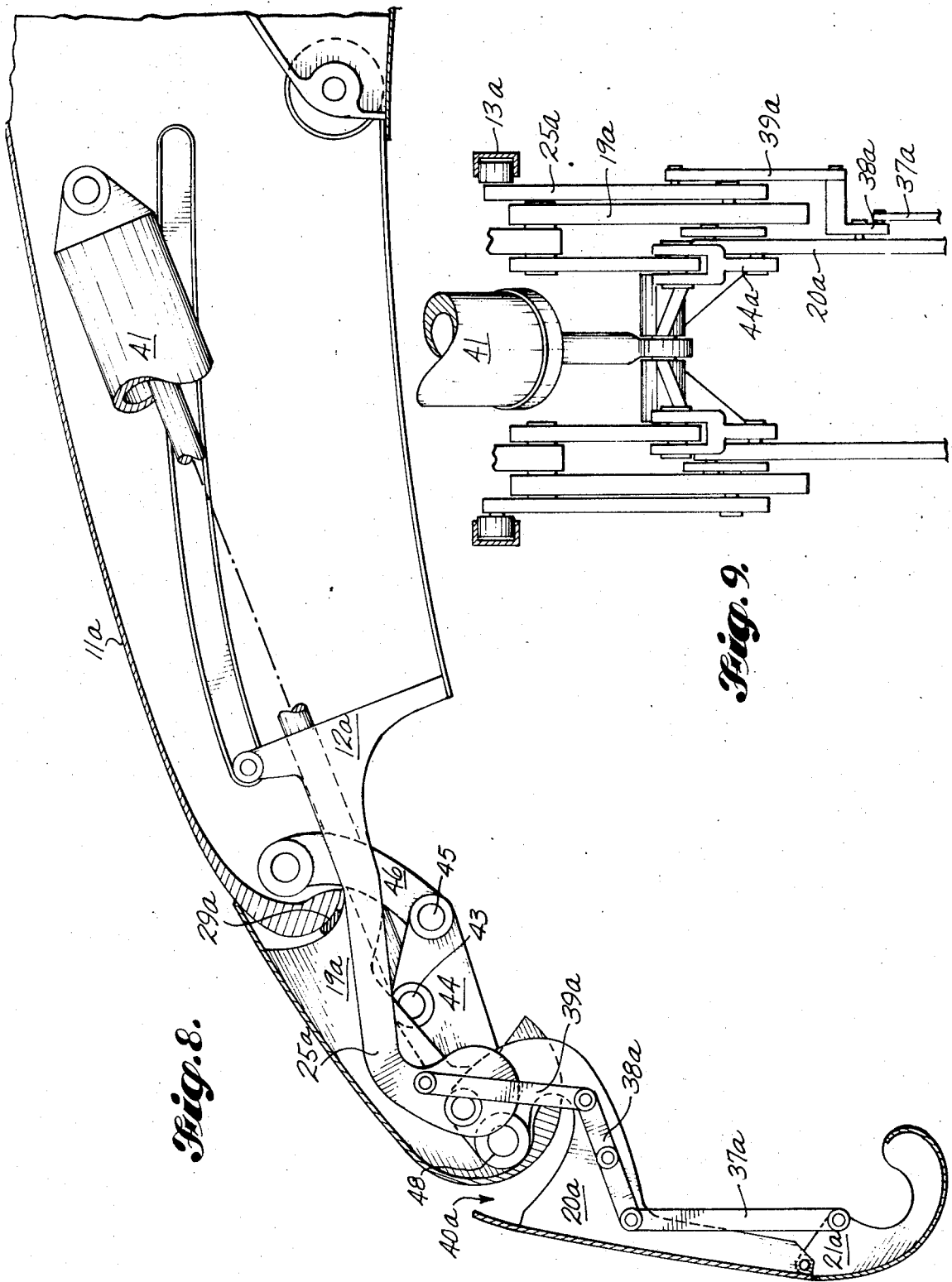

3,556,439

METHODS AND HIGH LIFT SYSTEMS FOR MAKING AN AIRCRAFT WING MORE EFFICIENT FOR TAKEOFFS AND LANDINGS

SUMMARY OF THE INVENTION

The disclosed invention comprises a new method of transforming a wing from a high-speed cruise configuration to a highly efficient takeoff configuration and to a highly efficient landing configuration and at least two systems for performing the method.

This method of making a more efficient wing comprises increasing the wing chord and camber over the optimum chord and camber for cruise flight by a substantial amount for aircraft takeoff, and increasing the wing chord and camber over the takeoff wing chord and camber for landing of the aircraft.

The systems for performing this method comprise a convertible wing including three interconnected flaps, fore and aft in tandem, the first flap being pivotally mounted to a wing leading edge portion and which portion may droop, wherein the three flaps are folded up internally of the wing for high-speed cruise flight.

More particularly, the trailing edge of the first flap is pivotally connected to the wing leading edge and extends forwardly simultaneously with drooping of the wing leading edge for takeoffs.

For landing, the second flap which has its trailing edge pivotally connnected to the leading edge of the first flap is unfolded from under the first flap to a position downwardly and forwardly of the first flap and spaced therefrom to form a slot therewith. Then the third flap, having its trailing edge pivotally connected to the leading edge of the second flap, is unfolded from under the second flap to a position downwardly and forwardly of the second flap for producing a greatly increased camber and chord in the wing to provide a slotted, high lift, slow-speed wing for landings.

Two different linkages are disclosed which require signal and double actuators for extension and retraction of the flaps.

Accordingly a principal object of this invention is to provide at least four methods for converting an aircraft wing from an efficient cruise configuration to a highly efficient takeoff configuration or to a highly efficient landing configuration.

Another principal object is to provide at least two wing systems for carrying out the above methods having at least two tandem leading edge flaps, one flap being extendible for takeoffs and both flaps being extendible for landings.

Another object of this invention is to provide a wing with three tandem leading edge flaps, one flap being extendible for takeoffs and all three flaps being extendible for landings.

A further object of this invention is to provide a wing as described in each of the above objects wherein smooth upper and lower wing surfaces with no discontinuities result with one flap extended.

Still another object of this invention is to provide a wing as described in each of the above objects wherein the nose of the wing droops simultaneously with the extension of the flaps. And further, another object of this invention is to provide flap folding linkages that are operable by a single actuator and double actuator, respectively.

Other objects and various advantages of the disclosed methods and high lift systems for making an aircraft wing more efficient for takeoffs and landings will be apparent from the following detailed description, together with the accompanying drawings, submitted for purpose of illustration only.

BRIEF DESCRIPTION OF DRAWINGS

The drawings diagrammatically illustrate by way of example, not by way of limitation, two forms of the invention wherein like reference numerals designate corresponding parts in the several views in which:

FIG. 2 is a schematic sectional view of a modification of the new high lift, triple, interconnected, leading edge flaps system on the leading edge of an aircraft wing, with parts cut away for clarity of disclosure, and operable by two actuators instead, the flaps being illustrated in retracted and cruise position;

FIG. 3 is a schematic sectional view of the triple leading edge flaps of FIG. 2, with parts cut away for clarity of disclosure with the leading edge portion drooped and only one of the flaps extended to form the takeoff configuration FIG. 4 is a schematic sectional view of the leading edge flaps of FIG. 2, with parts cut away for clarity of disclosure, and with the flaps in the fully extended and landing position;

FIG. 5 is a schematic sectional view taken at 5–5 on FIG. 4;

FIG. 6 is a schematic view of the modification of FIG. 1 with parts cut away for clarity of disclosure, and wherein the flaps being illustrated in retracted and cruise condition;

FIG. 7 is a schematic sectional view of the leading edge portion of FIG. 1, with the leading edge portion shown drooped and one flap illustrated extended for takeoff;

FIG. 8 is a schematic sectional view of the leading edge portion of GIG. 1, with parts cut away for clarity of disclosure, with the nose portion drooped and with the flaps in the fully extended and landing position; and FIG. 9 is a schematic front view of the leading edge flap actuation mechanism of FIG. 8, with skin parts cut away for clarity of disclosure.

DESCRIPTION OF THE PREFERRED EMBODIMENTS

Figure 1:
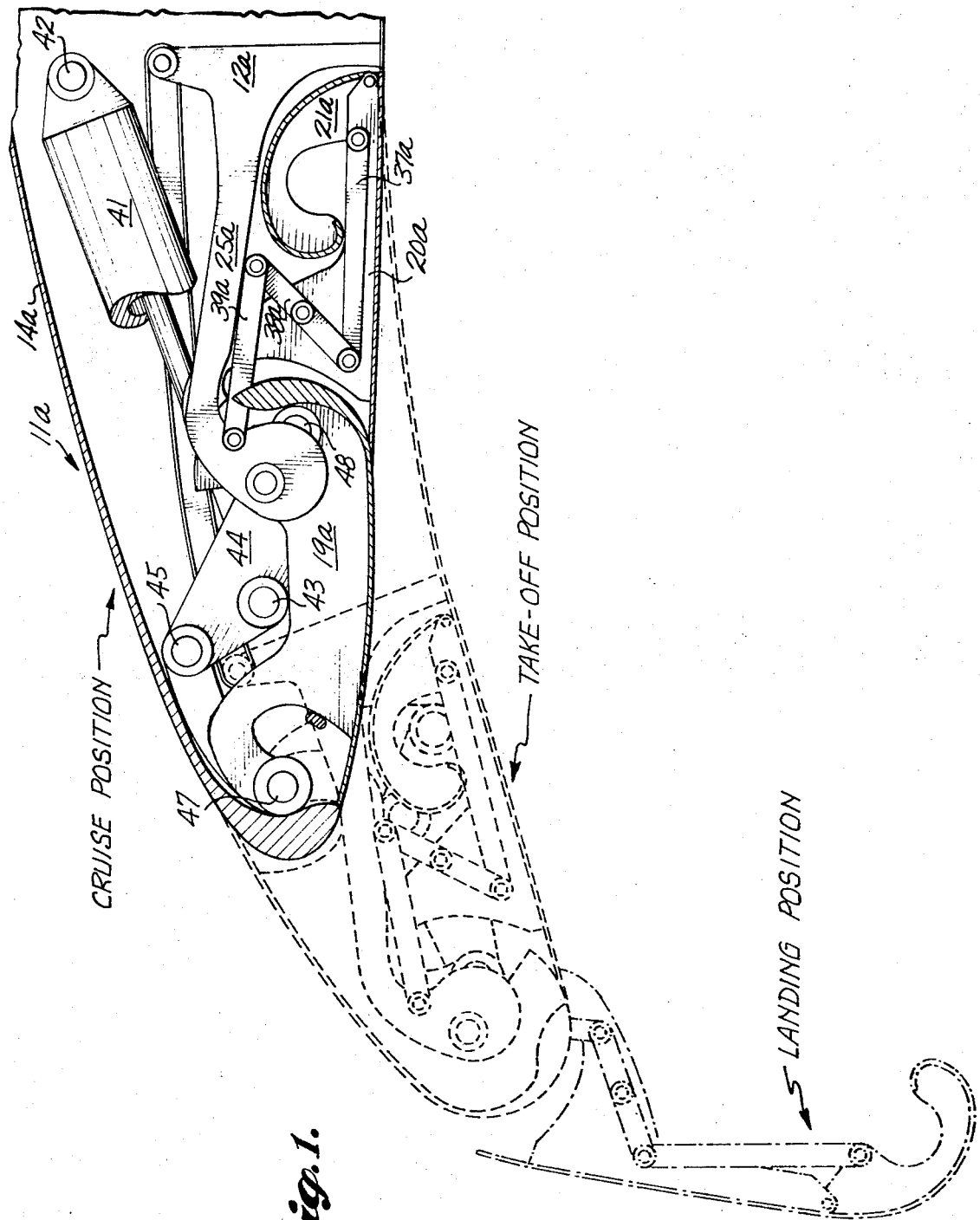
FIG. 1 is a schematic sectional view of the new high lift, triple, interconnected, leading edge flaps system on the leading edge of an aircraft wing illustrating the three flaps in the three positions: the solid line embodiment showing the cruise position; the broken line embodiment showing the takeoff position; and the dot-dash line embodiment showing the landing a position all operable by a single actuator.

The invention is not limited in its application to the details of construction and arrangement of parts shown and described, since the invention is capable of other embodiments and of being practiced or carried out in various other ways. Also it is to be understood that the phraseology or terminology employed herein is for the purpose of description and not of limitation.

The term "leading edge flap" for an airfoil, such as a wing, for example, has acquired the following limiting definition: an aerodynamic surface that is extendible generally forwardly from the lower surface of the leading edge of a wing, as contrasted with a "leading edge slat" which is an aerodynamic surface that is extendible generally forwardly from the wing leading edge upper surface and further forms a slot therewith.

A new method for converting a wing into more efficient configurations for takeoffs and landings comprises extending a leading edge flap from a retracted position in the wing leading edge to an extended position downwardly and forwardly of the wing leading edge for takeoffs, and it comprises extending two leading edge flaps from a retracted position in the wing leading edge to an extended position, one forward of the other, downwardly and forwardly of the wing leading edge for landings.

A second method for converting a wing into more efficient configurations comprises drooping the leading edge portion of the wing downwardly from a substantially horizontal position relative to the wing and extending a flap therefrom for takeoffs, and drooping the wing leading edge portion and extending two, interconnected leading edge flaps for landings.

A third method for converting a wing into more efficient configurations comprises extending a flap from the leading edge portion of the wing for takeoffs, and extending two more leading edge flaps, all in tandem with the first flap from the wing leading edge for landings.

A fourth method for converting a wing into more efficient configurations comprises drooping the wing leading edge portion and extending a leading edge flap therefrom for takeoffs, and drooping the wing leading edge portion and extending three leading edge flaps in tandem for landings.

The new results of changing the configuration of the vast majority of airfoils of wings in each of the four methods set forth above are the generation of an increase in lift over the high-speed cruise configuration of the wing for takeoff and an accompanying lower flight speed (permitted by the lower stalling speed) and yet the increased drag produced by one leading edge flap and/or drooping of the wing leading edge has been found not to be insurmountable by the takeoff power available. Further, it has been found that the above four methods likewise generate a still greater increase in lift for landings than for takeoffs and an accompanying still lower landing speed (permitted by the still lower stalling speed) and yet the increased drag produced by the two additional leading edge flaps and/or drooping of the wing leading edge has been found not insurmountable by power available during landings (including the forward thrust due to the glide approach), and wherein the drag of the above landing configuration is far too great for takeoff.

Incidentally, for an emergency takeoff of an aircraft in the above-described landing configuration, as during an aborted landing or an aircraft carrier "wave off," the second and third leading edge wing flaps are simply and quickly retracted to the takeoff configuration and takeoff is accomplished.

FIG. 1, a sectional view of the high lift convertible wing, illustrates the component parts or flaps of the leading edge portion of the wing in the three basic positions, shown in solid lines in the high-speed cruise configuration, shown in broken lines in the takeoff configuration, and shown in dot-dash lines in the high-speed cruise configuration. While the actuating linkages for the three leading edge flaps 19a, 20a, and 21a, have been deleted in FIG. 1 for clarity of disclosure, additional disclosure thereof appears in the remaining FIGS.

FIGS. 2—5 and FIGS. 6—9 disclose details of two embodiments for carrying out the above methods.

FIG. 2 illustrates an aircraft wing 10 in cruise position having a high lift leading edge portion 11 having a carriage 12 operable on downwardly inclining track 13, which track is fixed to and extends from the wing. Upper skin 14 of the leading edge portion 11 telescopes under the upper skin surface of wing 10 and the aft lower skin surface comprises a flexible sheet 15, as stainless steel or titanium, having its forward edge secured to lower leg 16 or carriage 12 and the rest of it stored on a spool or reel 17, or the like, in the wing 10 flush with lower wing skin 18.

Interconnected leading edge flaps, 19, 20, and 21, FIG. 2, are illustrated in retracted position, the optimum cruise position, wherein the greater portion of the under surface of the wing leading edge portion 11 is formed by the retracted first and second flaps, 19 and 20, respectively.

First leading edge flap 19, FIG. 2, is pivotally connected at one end thereof with pin 22 to the nose of the wing leading edge portion 11, second leading edge flap 20 is pivotally connected at one end thereof with pin 23 to the other end of first flap 19, and third leading edge flap 21 is pivotally connected at one end thereof with pin 24 to the other end of second flap 20. Pivot pin 23, FIGS. 2 and 3, which pivotally interconnects flaps 19 and 20, likewise connects these two flaps to the outer end of arcuate foreleg 25 for supporting the interconnected flap ends in the retracted position of FIG. 2.

FIG. 3 illustrates the wing leading edge portion having been extended and drooped and the first leading edge flap 19 unfolded or extended to the aircraft takeoff position. This is accomplished by the first flap actuator 26, pivotally connected between a fixed pivot 27 on the leading edge portion 11 and the pivot 28 on the first leading edge flap 19, unfolding or swinging the flap 19 to its extended forward an downward position. Further extension of actuator 26 and of first flap 19 pulls carriage 12 outwardly and downwardly on track 13 due to pivot 23 between flap 19 and carriage leg 25 and pulls the leading edge portion 11 to extended position due to pivot pin connection 22 between flap 19 and the leading edge portion 11. A seal 29 forms an airtight seal between first flap 19 and the leading edge portion 11 when in the takeoff position to ensure that no air leakage results at this point in the airfoil.

A leakage of air to the upper surface accelerates the boundary layer air which improves the lifting capability of the airfoil, but at the same time the drag increases due to to greater turbulence. The net effect of air leakage is a decrease in the lift to drag ratio (L/D ratio) which is detrimental to takeoff performance.

Bellcrank-shaped, second flap drive link 30, FIG. 3, has one end pivotally connected to the nose portion of the leading edge portion 11 with the pin 22 and has its center of fulcrum pivotally connected with pin 31 to arcuate drive link 32, the outer end of link 32 being pivoted with pin 33 to second flap 20. Thus as leading edge portion 11 is extended and drooped, the leading edge portion upper skin 14 is extended from the wing 10, the lower skin 15 is reeled out, and second flap 20 is partially actuated so that folded second flap 20 completes the lower skin surface of the extended leading edge portion 11, including its leading edge portion, in maintaining the optimum aerodynamic shape of the wing for takeoff.

FIG. 4 discloses the position of the triple leading edge flaps in the landing position wherein second flap 20 has been extended forwardly and downwardly of and spaced from first flap 19 by link 32 responsive to extension of a second actuator 34 connected between a fixed pivot 35 on the wing leading edge portion 11 and a pivot 36 on the bellcrank link 30 and the third flap 21 has been extended downwardly and forwardly of second flap 20 by interconnected third flap drive linkage 37, 38, and 39 pivotally connected between flaps 19, 20, and 21 for forming a slot in the wing and increasing the camber and chord of the wing beyond the takeoff configuration to the very high lift, slow speed, landing configuration.

The pin 23 interconnecting flaps 19 and 20 is positioned on flap 19 so that when the second flap 20 is extended to the landing position as shown in FIG. 4, a slot 40 is formed between the first and second leading edge flaps, 19 and 20, respectively; when the second flap 20 is partially folded to the takeoff position as shown in FIG. 2, a smooth continuous aerodynamically clean lower surface is formed with both the first flap 19 and the lower flexible skin 15; and when the second flap is completely folded to the high-speed cruise position as shown in FIG. 2, a smooth, continuous aerodynamically clean lower surface is formed with all of the first flap and the lower flexible skin and adjacent wing skin. With seal 29, FIG. 3, preventing any airflow at the center of the leading edge portion, the slot 40 is thus precisely at the best aerodynamic location for maximum lift from the highly cambered wing for landings.

FIG. 5, a view taken at 5-5 on FIG. 4, or a view looking upwardly and forwardly at the bottom of the wing 10 with the three leading edge flaps 19, 20, and 21 thereon and extended to landing position. FIG. 5 discloses additional details of the interconnecting and actuating linkage between the three flaps and the wing 10.

FIGS. 6—9 disclose the modification of FIG. 1 of the high lift system for an aircraft wing of FIGS. 2—5, differing principally by different actuating linkage operable by a single actuator 41, FIG. 6, instead of two actuators 26 and 34, FIGS. 2 and 3, for carrying out the new method set forth hereinbefore.

FIG. 6 shows the modified triple flap system folded up to the high-speed cruise position. Likewise as illustrated in both modifications of FIGS. 2 and 6, both first and second leading edge flaps 19, 19a, and 20, 20a , respectively form substantially one-half the lower surface of the wing leading edge portion when in a retracted position.

FIG. 7 shows the modified triple-flap system in the takeoff position wherein the single actuator 41 has extended leading takeoff portion 11a forwardly and downwardly and extended the first leading edge flap 19a similar to flap 19, FIG. 3, for increasing the wing camber and chord to form a high lift, low drag, convertible wing for takeoff.

Single actuator 41, FIG. 7 is pivotally connected at one end with pin 42 to fixed structure (not shown) in wing 10a and connected at the other end with pin 43 to a first flap drive, bellcrank-shaped link 44 in the intermediate portion thereof.

A pin 45 in one end of bellcrank-shaped link 44 pivotally connects the link to another flap drive link 46 which is pivoted to the nose of the leading edge portion 11a with pin 47. A pin 48, FIG. 7 connects the other end of drive link 44 to a flanged end of second leading edge flap 20a, similar to flap 20, FIG. 3. Adjacent to pin 48 is a pivot pin 49 pivotally connecting the flanged end of second flap 20a to both the first flap 19a and the leg 25a of carriage 12a rollable in track 13a. Likewise, as the leading edge portion 11a, FIG. 7, is extended to takeoff position by extension of the single actuator 41, the upper skin 14a is extended from telescoped position with in the wing, and the lower flexible skin 15a is unrolled from reel 17a whereby extended first flap 19a, partially extended second flap 20a, upper skin 14a, and lower skin 15a forms an aerodynamically clean high lift, drooped, leading edge portion of the wing for takeoff.

FIGS. 8 and 9 illustrate the fully extended position of all three flaps to the maximum left landing position, FIG. 8 being a longitudinal or chordwise vertical section through the wing with high lift leading edge portion 11a, with flexible lower skin 15 cut away for clarity of disclosure, and FIG. 9 being a front view of the flap actuation mechanism of FIG. 8 with skin parts cut away. In the wing high lift landing position of FIG. 8, the single actuator 41 and carriage 12a have been fully extended to their limits wherein second and third leading edge flaps 10a and 20a and 21a have been fully extended to their limits wherein second and third leading flaps 20a and 21a respectively have been fully extended leaving an aerodynamic slot 40a between the second and third flaps by forwardly, downwardly, and a slightly counterclockwise movement of flap drive link 44. Forward movement of drive link 44, FIG. 8, by actuator 41, and as controlled by drive link 46, fully extends second flap 20a from its FIG. 7 position to accordingly unfold third flap drive interconnected linkage 37a, 38a, and 39a, similar to linkage 37, 38, and 39, respectively, of FIG. 4 to extend third flap 21a, FIG. 8, seal 29a providing a positive seal between the first flap 19a and the leading edge portion 11a.

FIG. 9, a front view of the wing extended leading edge high lift portion of FIG. 8 with the three flaps' surfaces removed for showing the flaps' actuating linkage. While only the linkage to the left of the flaps' actuator 41, as viewed by the pilot, is identified, the right linkage is the enantiomorphic analogue of the left linkage. Here the first flap drive link 44 is operated by the actuator 41 to move the flanges of flaps 19a and 20a through the carriage leg 15a and its pivotal connections for likewise extending the interconnected third flap drive linkage 37a, 38a, and 39a.

Accordingly several methods have been disclosed and at least two mechanisms for carrying our the methods have been disclosed for converting a lifting foil, as an aircraft wing, from an efficient high-speed cruise position to a highly efficient takeoff configuration or to a highly efficient landing configuration.

While a few methods and only two embodiments of the invention for carrying out the methods have been disclosed, it will be evident that various other modifications are possible in the arrangement and construction of the disclosed methods and high lift systems for making an aircraft wing more efficient for takeoffs and landings, and it is accordingly desired to comprehend with the purview of this invention such modifications as may be considered to fall within the appended claims.

We claim:
1. In an aircraft with a wing having an optimum chord and camber for cruise flight, a method for making said wing more efficient for aircraft takeoffs and landings comprising:
   a. pivotally connecting the trailing edge of a first flap to the leading edge of said wing;
   b. extending said flap forwardly of said wing for increasing said wing chord and camber by a substantial amount for takeoff of said aircraft;
   c. pivotally connecting the trailing edge of a second flap to the leading edge of said first flap;
   d. pivotally connecting the trailing edge of a third flap to the leading edge of said second flap; and
   e. extending said three flaps forwardly and downwardly of said wing for increasing said wing chord and camber by a substantial amount greater than said takeoff wing chord and camber for landing of said aircraft.

2. A lifting foil having a leading edge portion for a vehicle operating in a fluid medium comprising:
   a. means for pivotally connecting the trailing edge or of a first flap to said lifting foil leading edge portion for movement from a retracted position forming the lower surface of said leading edge portion downwardly and forwardly to an extended position forwardly of said leading edge;
   b. means for drooping said leading edge portion;
   c. means for pivotally connecting the trailing edge of a second flap to the leading edge of said first flap for movement form a retracted position forming the lower surface of said leading edge or portion downwardly and forwardly of said first flap; and
   d. actuating means for extending said first flap and drooping said leading edge portion for converting said lifting foil from an efficient high-speed lifting foil to an efficient high lift lifting foil for takeoff, and for extending both said first and second flaps and drooping said leading edge portion for converting said lifting foil to an efficient higher lift lifting foil for landing.

3. A lifting foil having a leading edge portion for a vehicle operating in a fluid medium comprising:
   a. means for pivotally connecting the trailing edge of a first flap to said lifting foil for movement for a retracted position internally of said lifting foil to an extended position forwardly of said leading edge portion;
   b. means for pivotally connecting the trailing edge of a second flap to the leading edge of said first flap for movement form a retracted position internally of said lifting foil to an extended position forwardly of said extended first flap;
   c. means for pivotally connecting the trailing edge of a third flap to the leading edge of said second flap for movement from a retracted position internally of said lifting foil to an extended position forwardly of said extended second flap; and
   d. actuating means for extending said first flap for converting said lifting foil from an efficient high-speed lifting foil to an efficient high lifting foil for takeoff, and for extending all three leading edge flaps for converting said lifting foil to an efficient higher lift lifting foil for landing.

4. An aircraft wing having a leading edge portion comprising:
   a. means for pivotally connecting the trailing edge of a first flap to said wing leading edge portion for movement form a retracted position forming the lower surface of said leading edge portion downwardly and forwardly to an extended position forwardly of said leading edge;
   b. means for drooping said leading edge portion;
   c. means for pivotally connecting the trailing edge of a second to flap to the leading edge of said first flap for movement from a retracted position forming the lower surface of said leading edge portion downwardly and forwardly of said first flap; and
   d. actuating means for extending said first flap and drooping said leading edge portion for converting said wing from an efficient high-speed wing to an efficient high lit wing for takeoff, and for extending both said first and second flaps and drooping said leading edge portion for converting said wing to an efficient higher lift wing for landing.

5. An aircraft wing having a leading edge portion comprising:
   a. means for pivotally connecting the trailing edge of a first flap to said wing for movement from a retracted position internally of asia said wing to an extended position forwardly of said leading edge portion;

b. means for pivotally connecting the trailing edge of a second flap to the leading edge of said first flap for movement for a retracted position internally of said wing to an extended position forwardly of said extended first flap;

c. means for pivotally connecting the trailing edge of a third flap to the leading edge of said second flap for movement from a retracted position internally of said wing to an extended position forwardly of said extended second flap; and d. actuating means for extending said first flap for converting said wing from an efficient high-speed wing to an efficient high lift wing for takeoff, and for extending all three leading edge flaps for converting said wing to an efficient higher lift wing for landing.

6. An aircraft wing as recited in claim 5 wherein, said first flap forms a portion substantially one-half of the lower surface of said leading edge portion when in retracted position for providing a more efficient wing.

7. An aircraft wing as recited in claim 6 wherein, said second flap forms a portion substantially one-half of the lower surface of said leading edge portion when in retracted position for providing a more efficient wing.

MODIFICATION OF FIGURES 2—5

8. An aircraft wing as recited in claim 5 wherein, said actuator means comprises two actuator means for extending said first flap for takeoff and for extending all three of said leading edge flaps for landing.

9. An aircraft wing as recited in claim 5 wherein, said actuator means comprises two actuator means for drooping said leading edge portion and for extending said first flap for takeoff and for drooping said leading edge portion and for extending all three of said leading edge flaps for landing.

10. An aircraft wing as recited in claim 5 wherein, said actuator means comprises two actuator means for extending said leading edge portion forwardly and downwardly and for extending said first flap for takeoff, and for extending said leading edge portion forwardly and downwardly and for extending all three of said leading edge flaps for landing.

MODIFICATION OF FIGURES 1 and 6—9

11. An aircraft wing as recited in claim 5 wherein, said actuator means comprises a single actuator means for extending said first flap for takeoff and for extending all three of said leading edge flaps for landing.

12. An aircraft wing as recited in claim 5 wherein, said actuator means comprises one actuator means for drooping said leading edge portion and for extending said first flap for takeoff and for drooping said leading edge portion and for extending all three of said leading edge flaps for landing.

13. An aircraft wing as recited in claim 5 wherein, said actuator means comprises a single actuator means also for extending said leading edge portion forwardly and downwardly and for extending said first flap for takeoff, and for extending said leading edge portion forwardly and downwardly and for extending all three of said leading edge flaps for landing.

14. In an aircraft having a wing, a said wing comprising:

a. a leading edge portion, said wing leading edge portion comprising upper and lower surfaces telescopic with upper and lower surfaces of said wing; and b. actuator means for simultaneously extending both said upper and lower telescopic surfaces of said leading edge portion outwardly and downwardly from said wing for efficiently increasing the aerodynamic chord and camber of said wing.